(12) United States Patent
Lopez

(10) Patent No.: US 8,258,212 B2
(45) Date of Patent: Sep. 4, 2012

(54) METHOD FOR PRODUCING A POLYMER/BITUMEN COMPOUND, AND POLYMER/BITUMEN AND BITUMEN/POLYMER COMPOUNDS OBTAINED

(75) Inventor: Emile Lopez, Salies de Bearn (FR)

(73) Assignee: Fenixfalt, Societe par Actions Simplifiee, Salies de Bearn (FR)

( * ) Notice: Subject to any disclaimer, the term of this patent is extended or adjusted under 35 U.S.C. 154(b) by 700 days.

(21) Appl. No.: 11/663,556

(22) PCT Filed: Sep. 26, 2005

(86) PCT No.: PCT/FR2005/050784
§ 371 (c)(1),
(2), (4) Date: May 21, 2007

(87) PCT Pub. No.: WO2006/035183
PCT Pub. Date: Apr. 6, 2006

(65) Prior Publication Data
US 2008/0200594 A1 Aug. 21, 2008

(30) Foreign Application Priority Data
Sep. 27, 2004 (FR) ..................... 04 52172

(51) Int. Cl.
*C08L 95/00* (2006.01)
*C08L 9/06* (2006.01)
*B01D 39/14* (2006.01)
*B60R 13/08* (2006.01)

(52) U.S. Cl. ............... 524/59; 524/63; 524/64; 524/66; 524/67

(58) Field of Classification Search ............. 524/59, 524/63, 64, 66, 67
See application file for complete search history.

(56) References Cited

U.S. PATENT DOCUMENTS
4,130,516 A * 12/1978 Gagle et al. .............. 524/71
4,837,252 A   6/1989 Seguin et al.

FOREIGN PATENT DOCUMENTS
EP  0 321 189  *  6/1989
WO  97/26299     7/1997
WO  WO 97/26299  *  7/1997

* cited by examiner

*Primary Examiner* — William Cheung
(74) *Attorney, Agent, or Firm* — Young & Thompson

(57) ABSTRACT

A method for producing a solid intermediate compound for incorporating into liquid bitumen obtained from petroleum or into mineral oils in order to produce liquid/polymer bitumen. According to the method, a polymer for producing the liquid/polymer bitumen is hot-mixed with solid bitumen, the mixture is then cooled, and the solid intermediate compound thus obtained is split. The intermediate compound obtained, the liquid/polymer bitumen formed from the intermediate compound, and a bitumen-coated material containing the intermediate compound or liquid/polymer bitumen are also disclosed.

9 Claims, No Drawings

METHOD FOR PRODUCING A POLYMER/BITUMEN COMPOUND, AND POLYMER/BITUMEN AND BITUMEN/POLYMER COMPOUNDS OBTAINED

This application is the U.S. National Phase of International Application PCT/FR05/50784 filed Sep. 26, 2005, which claims the benefit of FRANCE 0452172 filed Sep. 27, 2004.

This invention relates to a process for the production of a solid polymer/bitumen compound.

Such a solid polymer/bitumen compound can be used in particular in the production of a bitumen/polymer after dissolution in the liquid bitumen.

The invention covers the bitumen/polymer that is obtained.

The invention also covers the mixtures, including said solid bitumen/polymer compound or said bitumen/polymer.

The polymers, for the large majority, following production are then divided, often in the form of granules for facilitating handling, shipping, storing, heating or mixing to produce compounds of suitable composition. This is reserved for polymers that have certain physical and mechanical properties that allow it.

This is not always the case and certain elastomers, for example, elastomers based on styrene and butadiene or isoprene retain, after production, adhesive properties. The physico-chemical characteristics of these products lead, after storage, to a reagglomeration of granules, produced in particular by their own weight.

It is known that the road surfaces consist of granulates that are natural and of suitable dimensions, with a specific composition, whose cohesion is ensured by a binder, bitumen easily made liquid by heating to 160° C. to provide a connection, whereby this bitumen is obtained from refining heavy petroleum products.

Bitumen is a complex natural compound that is produced by the refining industry. Its composition is variable based on the origin of the supplies and certain bitumens are not satisfactory because of the increasingly intense stresses to which they are subjected.

Starting from a single product, it is difficult to correct all the parameters because these parameters are for the most part linked, and modification of one brings about the alteration of the other. It is necessary to be satisfied with a compromise.

In some applications for improving the roughness of the highway, bitumen is applied to attach granulates to the surface so as to increase the pneumatic adhesion/surface.

This application of bitumen also makes it possible to likewise limit the infiltrations, source of degradation of the highway, which led to generalizing this practice. It is in this application that the requirements for improving the characteristics of the bitumens apply most directly.

In the case of repairing the sealing of the surface, bitumen is also applied to limit the infiltrations, source of degradation.

One of the main improvements consisted in introducing polymers into the bitumen to correct the defects thereof, more particularly elastomers and thermoplastics. This actually makes it possible to improve significantly the mechanical properties and the durability by increasing the cohesion, the capacity for deformation and the elastic recovery over the largest range with the extreme temperatures of use.

This addition consists in an introduction of several percents of polymers in the bitumen, from 3 to 7% to provide a connection.

To carry out this introduction, the liquid bitumen, brought to a temperature of between 140 and 180° C., is stirred with the polymer by any suitable means and in particular by vertical stirring mechanisms.

The dissolution time is essentially proportional to the amount of polymer that is introduced and therefore to the desired concentration.

For a batch of 20 to 50 tons, the duration may reach 24 hours because of a random maceration/swelling time depending on the nature of the bitumen and characteristics of the polymer.

The thus obtained bitumens/polymers have high viscosities and should be stored hot and at temperatures above those of the polymer-free bitumens.

The range of temperatures varies from 170° C. to 200° C. according to the use, storage or pumping, for example.

The shipping is therefore made very complicated and the induced costs make long-distance shipping impossible.

In some special cases, by means of special containers with internal heating systems that bring the product back to temperature after shipping, it is possible to consider long-distance shipping. Nevertheless, the applications remain very limited.

If shipping logistics had to be set up, they would require extremely heavy investments.

The development of such products with improved physico-chemical parameters, however, also involves implementation in countries that need them and that are often far from production sites. Such countries have low financial capacities and require costs that are compatible with these low economic capacities.

For the remainder of the description, liquid bitumen is defined as the bitumen of petroleum origin that is obtained from refining and able to be made liquid at temperatures on the order of 150° C. or else mineral oils.

For the remainder of the description, solid bitumen is defined as the bitumen that is obtained from products such as asphaltite of mining origin or petroleum coke.

This invention proposes a process for the production of a solid intermediate compound: solid bitumen/polymer, in particular for the production of a liquid bitumen/polymer that addresses this problem and that allows an easy dissolution of the polymer when the solid intermediate compound is introduced into the liquid bitumen for producing a liquid bitumen/polymer but primarily that allows a solid intermediate compound that can be stored in divided form, in bulk and at ambient temperature to be obtained.

The invention also relates to obtaining a liquid bitumen/polymer that is obtained from this solid intermediate compound.

Furthermore, the use of the solid intermediate compound makes it possible to obtain mixtures directly in a coating kneader from a factory for producing mixtures, mixtures of which the bitumen is either a liquid bitumen/polymer that is obtained in situ or a liquid bitumen/polymer that is regenerated by chemical modification during a hot recycling operation of old mixtures.

The invention will now be described in detail and completed by sample embodiments.

Solid bitumens that come in the form of rocks, able to be ground because of their fragility, i.e., their propensity to break under impacts, are known. These are, for example, asphaltite of mining origin, petroleum coke, coal tar, shale or else bituminous sand.

In contrast, the rigidity of these solid bitumens and the low penetration coefficient, less than zero $100^{th}$ of a millimeter, make them unsuitable for use as a road bitumen, similar to liquid bitumen of petroleum origin. The process according to this invention consists in mixing a polymer capable of producing a liquid bitumen/polymer with such a solid bitumen.

The solid bitumen thus ensures a reduction of the viscous nature of the polymer, facilitating the shearing and the breaking, thus allowing the presentation in divided, granular form.

The presence of solid bitumen in the polymer, in divided form, also prevents the re-agglomeration of granules with the consequences that such a clumping would cause.

If certain polymer-rich compositions, or the very fact that polymer properties are present, result in a certain degree of clumping, it is possible to introduce agents such as silica, talc or limestone that then greatly eliminate this risk.

It thus is possible to provide the following sample embodiments of a solid intermediate compound of polymer/solid bitumen according to the invention.

The following products are mixed:
Ethylene vinyl acetate (EVA) copolymer, elastomer copolymers of stereoregulated type, di- or tri-blocks, styrene butadiene (SB) or styrene butadiene styrene (SBS),
Solid bitumen comprising:
Solid asphaltite of mining origin: penetration at 25° C., zero $100^{th}$ of a millimeter, softening temperature 120° C., loss of mass upon heating at 163° C. for 5 hours less than 0.10%, 8% insoluble materials, or
Bituminous coke: penetration at 25° C., zero $100^{th}$ of a millimeter, softening temperature 130° C., loss of mass upon heating at 163° C. for 5 hours less than 0.15%.

The polymer is introduced at a rate of 5 to 90% into the mixture.

The polymer is heated between 110° C. and 190° C., and the solid bitumen is brought to a temperature of 200 to 250° C.

The mixed batch is vigorously kneaded to ensure good homogeneity of the composition.

The compound that is obtained is then divided at ambient temperature.

The solid intermediate compound is thus obtained according to the invention.

This solid intermediate compound can then be combined with liquid bitumen.

EXAMPLE 1

The following are mixed:
50% liquid bitumen with a penetration of 180 100ths of millimeters, and
50% of a solid intermediate compound according to this invention that consists of 60% diblock styrene butadiene (SB) polymer.

It is noted, surprisingly enough, that the dissolution period of the solid intermediate compound, therefore 30% of the polymer that it contains, is reduced by 60% relative to the dissolution of 30% of this same polymer directly into the liquid bitumen with a penetration of 180 100ths of millimeters.

Clumping tests were carried out on this solid intermediate compound, which should be highly susceptible to this phenomenon owing to the significant self-agglomerating properties of the polymer that was used.

The granules have about 1 to 2 millimeters on a side.

These granules are placed at 30° C. under a feedstock of 4 kg/m² without noting clumping after a 1-month period.

EXAMPLE 2

The following are mixed:
95% liquid bitumen with a penetration of 70 100ths of millimeters, brought to 170° C., and
5% of a solid compound according to this invention, granulated, consisting of 60% diblock styrene butadiene (SB) polymer, whereby the balance is a solid bitumen.

After mixing, 0.07% elementary sulfur in powder form is added with additional stirring to ensure the dispersion of this sulfur.

The liquid bitumen/polymer that is obtained has the following parameters:
A penetration of 56 100ths of millimeters, softening temperature TBA of 62° C. and elastic recovery 51%.

EXAMPLE 3

The following are mixed:
91.6% liquid bitumen with a penetration of 70 100ths of millimeters, brought to 170° C., and
84.% of a solid compound according to this invention that consists of 60% diblock styrene butadiene (SB) polymer, whereby the balance is a solid bitumen.

After mixing, 0.07% elementary sulfur in powder form is also added, as above, with additional stirring to ensure the dispersion of this sulfur.

The liquid bitumen/polymer that is obtained has the following parameters: a penetration of 59 100ths of millimeters, softening temperature TBA of 67° C., and elastic recovery of 64%.

In these examples 2 and 3, it is noted that the characteristics of the liquid bitumen/polymer that is obtained by introduction of the solid intermediate compound are identical to those of the liquid bitumen/polymer that is obtained by direct dissolution of the polymer alone directly in said liquid polymer, in the same proportions, but with a duration of 50% longer than that of the direct dissolution.

EXAMPLE 4

The following are mixed:
90% liquid bitumen with a penetration of 70 100ths of millimeters, brought to 170° C., and
10% of a solid compound according to this invention containing 50% of a mixture of two polymers with 30% linear tri-block styrene butadiene styrene (SBS) and 20% ethylene vinyl acetate (EVA), whereby the balance is a solid bitumen.

After mixing, the liquid bitumen/polymer that is obtained has the following parameters:
A penetration of 57 100ths of millimeters, softening temperature TBA of 59° C., and elastic recovery of 66%.

These properties are comparable to those obtained for the same modified bitumen that is prepared by direct dissolution of 3% SBS and 2% EVA in bitumen with a penentration of 70 100ths of millimeters brought to 170° C.

The possibility of producing liquid bitumens/polymers from a solid intermediate compound according to the invention by preserving at least the properties of the liquid bitumens/polymers produced by direct dissolution of the polymer in the liquid bitumen is therefore noted, but with a significant gain of dissolution time of 50% and more and improved manipulation possibilities, possibilities for storage without clumping, and therefore greatly facilitated shipping possibilities of the solid intermediate compound.

It is possible to produce mixtures by resorting to liquid bitumen that has itself been obtained from the solid bitumen/polymer according to the invention.

It is thus possible to provide the following example:

Production of a 0/12-type road mixture for a road surface based on a modified bitumen.

The mixture thus comprises:

Mixture of mineral aggregates with a grain size of 0/12, 8.5% filler, and

Liquid bitumen/polymer, 5.7 parts per 100.

The aggregates and filler should be brought to a temperature of 180° C., and the liquid bitumen/polymer should be brought to a temperature of 170° C.

Thus, for an amount of 4000 g of aggregates, 228 g of liquid bitumen/polymer of Example 3 is introduced.

In one production method, the liquid bitumen/polymer is produced in situ directly in the coating kneader by successively mixing it with granulates brought to 180° C. of:

195.8 g of bitumen with a penetration of 62 100ths of millimeters, heated to 170° C. (or 86.32% bitumen)

19.2 g of solid solid-bitumen/polymer intermediate compound according to this invention, such as the one of Examples 1 to 3 (or 8.42% solid intermediate compound), and 12 g of dilute organic polysulfide solution in mineral oil (or 5.26% polysulfide).

The characteristics and mechanical properties of the mixtures obtained with these polymer bitumens according to the invention, prepared in two different forms, are identical.

In the case of an old mixture that it is desired to recycle, it is suitable to bring its temperature to between 160 and 190° C. to liquefy the aged and dispersed bitumen that it contains.

The addition of additives and in particular a solid solid-bitumen/polymer intermediate compound according to the invention makes it possible to regenerate the aged bitumen into a conventional bitumen or to regenerate and reconstitute the bitumen into a new bituminous binder of the bitumen/polymer type within a recovery mixture within the framework of its recycling.

The invention claimed is:

1. A process for the production of a solid intermediate compound that is provided for being incorporated in a liquid bitumen of petroleum origin or in mineral oils for the production of a liquid bitumen/polymer, comprising the steps of:
   a) preparing a solid bitumen by heating said solid bitumen at a temperature of between 200° and 250 ° C., the solid bitumen having a sufficiently low penetration coefficient at room temperature 25° C. that the penetration coefficient measures zero on a $100^{th}$ millimeter scale;
   b) bringing a polymer to a temperature of between 110° and 190° C.;
   c) mechanically, vigorously mixing said solid bitumen as prepared according to the step a) with the polymer as prepared according to the step b) to form a mixture;
   d) cooling the mixture to obtain a solid intermediate compound obtained from said solid bitumen and said polymer; and
   e) dividing the solid intermediate compound into a divided form.

2. The process for production according to claim 1, wherein the solid bitumen is selected from among asphaltite of mining origin, petroleum coke, coal tar, bituminous shale, and bituminous sand.

3. The process for production according to claim 1, wherein said divided-form mixtures of the solid intermediate compound comprise 5 to 90% polymer.

4. Solid bitumen/polymer intermediate compound, obtained by the implementation of the process according to claim 1, wherein it comprises 5 to 90% polymer.

5. Liquid bitumen/polymer that comprises a proportion of 5 to 50% of the intermediate compound according to claim 4, introduced into a liquid bitumen with a penetration of between 10 and 300 100ths of millimeters.

6. Liquid bitumen/polymer according to claim 5, wherein it also comprises sulfur.

7. Road mixture that includes liquid bitumen/polymer that is obtained directly from the intermediate compound according to claim 4.

8. Road mixture that includes liquid bitumen/polymer that is obtained directly from the solid intermediate compound according to claim 5.

9. Road mixture that includes liquid bitumen/polymer that is obtained directly from the solid intermediate compound according to claim 6.

* * * * *